United States Patent [19]
Fore

[11] Patent Number: 5,555,665
[45] Date of Patent: Sep. 17, 1996

[54] SCENT-RELEASING POLE FOR ATTRACTING DEER

[76] Inventor: John C. Fore, 34264 Hwy. 16 N., Denham Springs, La. 70726

[21] Appl. No.: 420,773

[22] Filed: Apr. 12, 1995

[51] Int. Cl.$^6$ ............................................. A01M 31/00
[52] U.S. Cl. .................................................. 43/1; 43/129
[58] Field of Search ..................... 43/1, 129; 222/146.2; 239/136

[56] References Cited

U.S. PATENT DOCUMENTS

| | | | |
|---|---|---|---|
| 3,046,192 | 7/1962 | Bilyeu | 43/1 |
| 3,119,650 | 1/1964 | Bilyeu | 43/129 |
| 4,771,563 | 9/1988 | Easley | 43/1 |
| 4,773,177 | 9/1988 | Gray, II | 43/1 |
| 4,937,431 | 6/1990 | Jameson | 43/1 |
| 5,094,025 | 3/1992 | Daniels | 43/1 |
| 5,161,646 | 11/1992 | Aurich | 43/1 |
| 5,305,541 | 4/1994 | Simpson | 43/1 |
| 5,307,584 | 5/1994 | Jarvis | 43/1 |
| 5,359,801 | 11/1994 | Mattucci | 43/1 |
| 5,429,271 | 7/1995 | Porter | 43/1 |

Primary Examiner—Kurt Rowan
Attorney, Agent, or Firm—Reginald F. Roberts, Jr.

[57] ABSTRACT

A scent-releasing pole for attracting deer to a hunter. Two tapers are disposed in a hollow tube, and extend above the open upper end of the tube. Each taper is made up of a combustible stick, around the upper end of which is wrapped a layer of peat. The layer of peat is partly overlaid with a semicircular layer of wax impreganted with a scent which attracts deer. The scent is released by burning the tapers.

4 Claims, 1 Drawing Sheet

SCENT-RELEASING POLE FOR ATTRACTING DEER

BACKGROUND OF THE INVENTION

The present invention relates to deer hunting. More particularly, the invention relates to a device and method for attracting deer to a deer-hunter's stand.

Deer feeders are commonly used for this purpose. However, such feeders are expensive to build and maintain, and are not portable. A need exists, therefore, for a portable, inexpensive device for luring deer to a hunter. The present invention provides such a device, as well as a method for using the device to attract deer.

SUMMARY OF THE INVENTION

In general, the present invention provides a device and a method for attracting deer.

The device is a scent-releasing taper or pole.

The scent-releasing taper comprises an elongated combustible member. An inner layer of peat circumscribes the upper portion of the elongated combustible member. An outer substantially semicircular layer of wax is impregnated with a scent which attracts deer. The layer of scent-impregnated wax overlaps in a substantially one-hundred-and-eighty-degree configuration about half of the upper portion of the elongated combustible member and the inner layer of peat.

The scent-releasing pole comprises a hollow tube open at its upper end and closed at its lower end. First and second scent-releasing tapers are disposed within the tube and extend above the open end of the tube. Each taper comprises an elongated combustible member, and inner layer of peat circumscribing the upper portion of the elongated combustible member, and an outer substantially semicircular layer of wax impregnated with a scent which attracts deer. The layer of scent-impregnated wax overlaps in a substantially one-hundred-and-eighty-degree configuration about half of the upper portion of the elongated combustible member and the inner layer of peat. This embodiment of the invention includes means for spacing the first and second tapers away and apart from the interior lateral surface of the tube.

The method for using the scent-releasing device to attract deer comprises artificially releasing a scent which attracts deer.

DETAILED DESCRIPTION OF THE INVENTION

Figure 1:
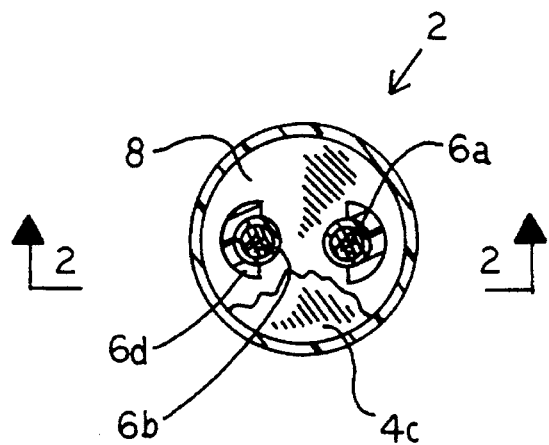
FIG. 1 is a top plan view of a scent-releasing pole for attracting deer, made in accordance with the principles of the present invention.
Figure 2:
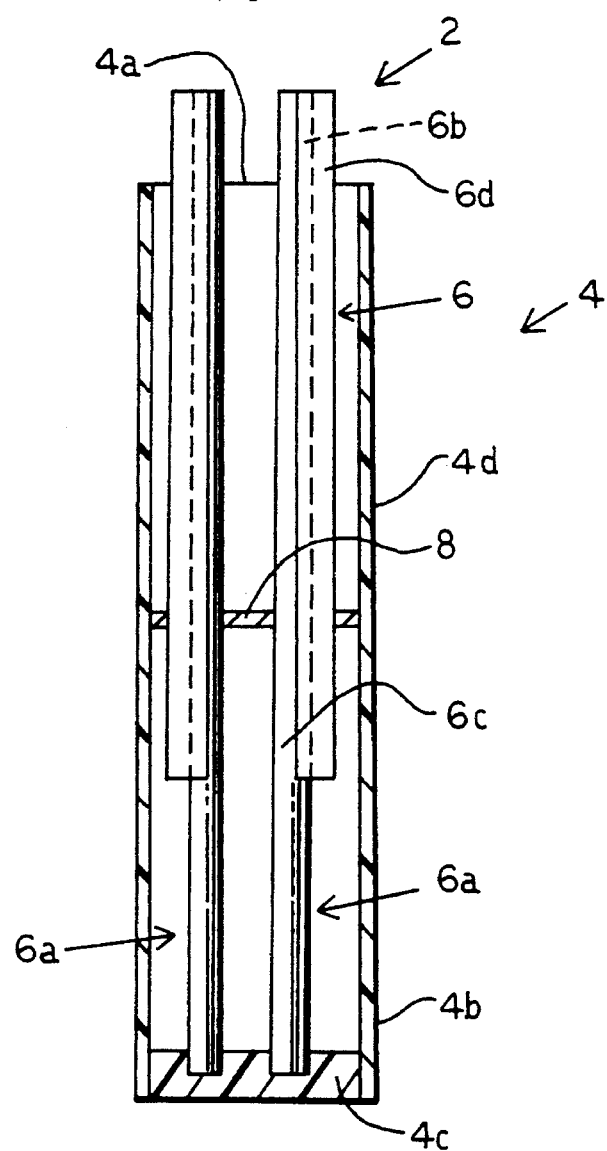
FIG. 2 is a cross-sectional view of the pole shown in FIG. 1, taken along the cutting line 2—2.

More specifically, reference is made to FIGS. 1 and 2, in which is shown a scent-releasing pole for attracting deer, made in accordance with the principles of the present invention, and generally designated by the numeral 2.

The scent-releasing pole 2 comprises a hollow tube 4 having a lateral portion 4d, open at its upper end 4a and closed at its lower end 4b by a bottom portion 4c.

First and second scent-releasing tapers 6 are disposed within the tube 4, and extend above the open end 4a of the tube 4. Each taper 6 comprises an elongated combustible member such as a wooden stick 6a or a plurality of such sticks fastened together. An inner layer of peat 6b circumscribes the upper two-thirds to three-fourths 6c of the stick 6a, and an outer substantially semicircular layer of wax 6d impregnated with a scent which attracts deer partially overlays the inner layer 6b of peat.

It is critical that a substantially semicircular configuration of the wax layer 6d be used. If much less wax were used, there would be an insufficient amount of scent-impregnated wax 6d to provide a strong and far-reaching scent when the wax 6d is burned. If much more wax were used, the taper 6 would not burn efficiently and would possibly self-extinguish.

The wax which comprises the outer layer 6d of the first taper 6 is impregnated with deer urine, and the wax comprising the outer layer 6d of the second taper 6 is impregnated with freshly-tilled earth. If a single taper 6 is used to attract deer, the wax layer 6d is impregnated with both scents; viz., deer urine and freshly-tilled earth. The deer urine may be natural or synthetic; the freshly-tilled earth is synthetic. Both scents are commercially available from Fidelity Flabors & Fragrances, Inc., 261 Ridgeview Terrace, Goshen, N.Y. 10924.

A spacer 8 is used to hold the tapers 6 away and apart from the interior surface of the tube 4. The taper 8 performs the dual function of providing ventilation for the tapers 6 and preventing ignition of the tube 4.

The lateral portion 4d of the tube 4 is beneficially made of cardboard, and the bottom portion 4c of foamed polystyrene. The spacer 8 is beneficially made of metal.

To lure deer, the scent-releasing taper 6 or scent-releasing pole 2 is lit, e.g. with a match, and placed near a deer stand (not shown). Alternatively, the taper 6 or pole 2 may of course be positioned proximate the stand and lit thereafter. As the taper 6 or pole 2 burns and heats the wax 6d, the taper 6 or pole 2 emits a very strong and distinctive buck-in-rut scent combined with a very strong scent of freshly-tilled earth. This combination of scents very accurately mimics the odor emitted by a buck making a scrape. The scent will travel very long distances to attract dominant bucks in the area to come and investigate another buck making a scrape.

The tapers 6 are beneficially made from peat-coated sticks sold by fireworks wholesalers and retailers. A specific commercial source is Gulf Coast Fireworks, Inc., 6800 Scenic Highway, Baton Rouge, La. 70807. The tapers 6 are commonly used to light fireworks.

I claim:

1. A scent-releasing taper for attracting deer, comprising:
    (a) an elongated combustible member;
    (b) an inner layer of peat circumscribing an upper portion of the elongated combustible member; and
    (c) an outer substantially semiciricular layer of wax impregnated with a scent which attracts deer, the layer of scent-impregnated wax overlapping in a one-hundred-and-eighty-degree configuration about half of the upper portion of the elongated combustible member and the inner layer of peat.

2. The scent-releasing taper of claim 1, wherein the wax is impregnated with deer urine and freshly-tilled earth.

3. A scent-releasing pole for attracting deer, comprising:
    (a) a hollow tube open at its upper end and closed at its lower end;

(b) first and second scent-releasing tapers disposed within the tube and extending above the open end of the tube, each taper comprising an elongated combustible member, an inner layer of peat circumscribing the upper portion of the elongated combustible member, and an outer semicircular layer of wax impregnated with a scent which attracts deer, the layer of scent-impregnated wax overlapping in a one-hundred-and-eighty-degree configuration about half of the upper portion of the elongated combustible member and the inner layer of peat; and (c) means for spacing the first and second tapers away and apart from the interior lateral surface of the tube.

4. The scent-releasing pole of claim 3, wherein the wax comprising the outer layer of the first taper is impregnated with deer urine, and the wax comprising the outer layer of the second taper is impregnated with freshly-tilled earth.

* * * * *